Figure 1:
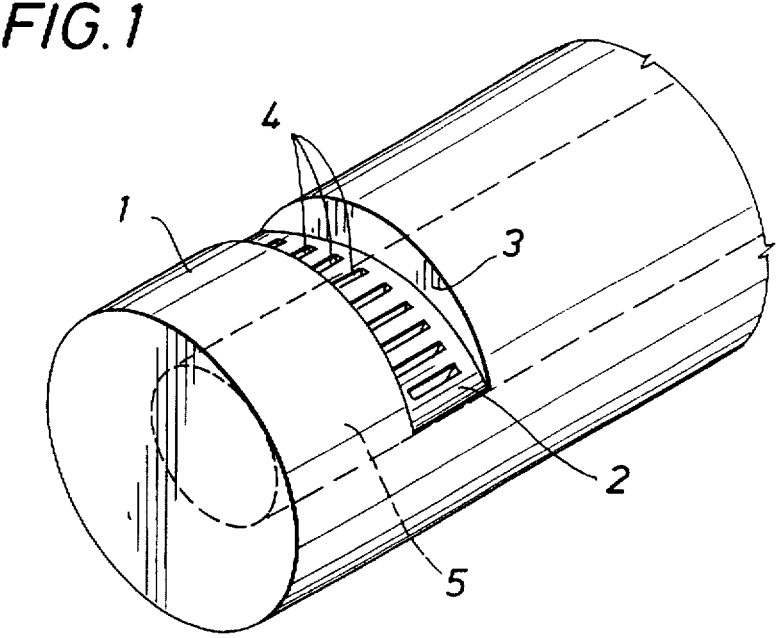

United States Patent

Vlug

[11] Patent Number: 5,798,068
[45] Date of Patent: Aug. 25, 1998

[54] PROCESS OF MELT IMPREGNATION

[75] Inventor: Marc Andrew Vlug, Amsterdam, Netherlands

[73] Assignee: Shell Research Limited, United Kingdom

[21] Appl. No.: 704,640

[22] PCT Filed: Mar. 16, 1995

[86] PCT No.: PCT/EP95/01024

§ 371 Date: Nov. 4, 1996

§ 102(e) Date: Nov. 4, 1996

[87] PCT Pub. No.: WO95/25000

PCT Pub. Date: Sep. 21, 1995

[30] Foreign Application Priority Data

Mar. 17, 1994 [EP] European Pat. Off. ............... 94301920

[51] Int. Cl.⁶ .................................................. B29C 41/24
[52] U.S. Cl. .................. 264/171.13; 156/166; 156/180; 264/136; 425/114
[58] Field of Search .................. 264/171.13, 136, 264/171.23; 425/112, 113, 114; 156/166, 180

[56] References Cited

U.S. PATENT DOCUMENTS 4,537,801  8/1985  Takeda ................................ 427/356

FOREIGN PATENT DOCUMENTS 0167303  6/1985  European Pat. Off. ........ B29C 47/02
0397506  5/1990  European Pat. Off. ........ B29C 67/14

*Primary Examiner*—Jan H. Silbaugh
*Assistant Examiner*—Mark Eashoo
*Attorney, Agent, or Firm*—Dennis V. Carmen

[57] ABSTRACT

A process of making a fiber-reinforced polymeric material comprises sliding a fiber bundle over an arcuate support surface (2) in the line of the arc, and injecting into the bundle a molten or liquid polymer through a plurality of slots (4) in the surface, each slot being transverse to the bundle. The process allows effective impregnation of materials, at relatively high production speed and low capital costs.

11 Claims, 1 Drawing Sheet

PROCESS OF MELT IMPREGNATION

1. FIELD OF THE INVENTION

The present invention relates to a process of melt impregnation, in particular for preparing fibre-reinforced resin materials.

2. BACKGROUND OF THE INVENTION

Fibre-reinforced resin materials are high in strength but light in weight, and are therefore highly desirable building materials in a number of industries.

A process of making such materials is described in EP-B-0167303, in which a fibre bundle is slid over a heated extruder head having an arcuate surface, and molten thermoplastic polymer is injected into the fibre bundle, from a slot in the arcuate surface, in a direction transverse to the array of filaments making up the fibre bundle.

When this process is used with relatively viscous materials, a significant operational problem is experienced, in that the extruded polymer tends to push the fibre bundles away from the surface of the extruder head rather than penetrating the bundle and thereby coating the individual fibres thereof. Fibres that are not encircled with polymer (wetted) do not contribute to the mechanical properties of the composite material. In further processing steps the fibre wetting can be improved but this often leads to a degradation in fibre length and consequently reduces the reinforced efficiency of the fibres. Attempting to overcome this problem by increasing fibre pressure onto the extruder head leads to unacceptably high friction over the extruder head.

EP-A-397506 discloses a process which differs from that of EP-B-167303 in the presence of two slit-like feed openings to the opposite sides of the arcuate surface, or more than 2 such openings. EP-A-397506 does not disclose any technical effect of having more than one slit-like opening.

The present invention provides a process of making a fibre-reinforced polymeric material comprising the steps of sliding a fibre bundle over an arcuate support surface in the line of the arc, and injecting into the bundle a molten or liquid polymer, characterized in that the polymer is injected through at least eight slots in the surface, each slot being substantially transverse to the bundle.

The process of the invention allows surprisingly effective impregnation of materials; for instance, it ensures that the individual fibres in the fibre bundle are encircled by polymer. It is therefore capable of producing more uniform materials than the prior art.

In addition, the process can be used to make fibre-reinforced polymeric resin materials at relatively high production speed and low capital costs.

4. BRIEF DESCRIPTION OF THE DRAWINGS

Figure 2:
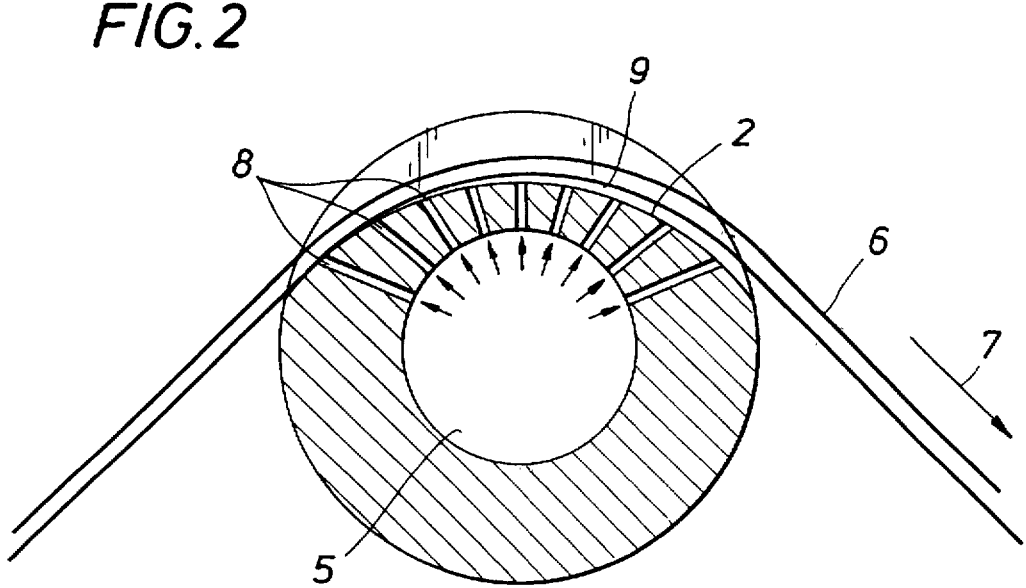

FIG. 1 is a prospective view of part of the apparatus suitable for use in the process of the invention; and FIG. 2 is a part cross section of the apparatus of FIG. 1 in use, with a fibre bundle passing over its surface.

5. DETAILED DESCRIPTION OF THE INVENTION

Describing the process of the invention in more detail; a fibre bundle is slid over an arcuate surface. Use of an arcuate surface enables axial tension in the fibre to be converted into a radial force of the fibre towards the support surface. This radial force can be influenced by the axial pretension in the fibre, the contact angle of the fibre on the surface and the radius of the surface. Within these parameters, the surface geometry can be optimised for a certain pultrusion speed, fibre permeability and polymer viscosity.

The arcuate support can be provided by the surface of a support, for example, when the support is cylindrical. Alternatively, it can be provided by cutting an arcuate section, or trench, through a support. The remainder of the support can be any suitable shape to allow co-operation with other equipment with which it is to be used. For example, it may be mounted on an extruder. It is preferred that side walls extend upwardly from the surface, to facilitate handling of the fibre bundle passing over it and to prevent polymer from escaping sideways from under the fibre bundle.

Molten or liquid polymer, typically a thermoplastic polymer (though thermoset resins can be used), is pressed through a plurality of slots in the arcuate surface of the impregnation tool. These slots are substantially transverse to the direction of fibre alignment and bundle movement, since otherwise the fibres could become entrapped in the slots. There are at least eight slots in the arcuate surface but preferably there are more, for instance at least 12. The number of slots depends upon, for instance, the thickness of the bundle that has to be impregnated, the viscosity of the polymer used and the pultrusion speed required. The polymer creates a film between the surface of the tool and the glass fibre. This polymer film simultaneously lubricates the process and impregnates the glass fibre. Since the fibre is impregnated from one side, air is expelled through the other side of the fibre bundle, reducing the void content of the composite. The thickness of the polymer film is an important parameter. If the film is too thin the fibres will touch the tool surface, resulting in frictional forces between the tool surface and the fibre, and no more impregnation of the fibre will occur. If the film thickness is too high the polymer will push the fibre aside and flow other than through the fibre bundle, creating excessive amounts of voids in the composite. Typical film thicknesses are in the range of 0.05 to 1 mm.

When a fibre is passing over a slot in the tool surface an amount of polymer is delivered through the slot forming a film with a certain thickness. This film thickness is limited as explained above and, in case of high viscosity polymers, does not contain enough polymer to wet-out all the filaments in the fibre bundle when operating according to prior art methods. Following the surface of the tool the polymer is pressed into the fibre bundle increasing the degree of impregnation and reducing the polymer film thickness. Well before the film thickness is reduced to zero and the fibres touch the tool surface, polymer is added to the film by another slot in the tool, etc., until the fibre bundle is fully impregnated. With relatively low viscosity polymers, 50 Pa.s and below (at $10^3$–$10^4$ Pa.s shear stress and operating temperature), the travelling speed of the polymer through the fibre bundle may be so high that one slot and a small contact area on the tool is sufficient. But with relatively high viscosity polymers, 100 Pa.s and higher (at $10^3$–$10^4$ Pa.s shear and operating temperature), the pultrusion speed would need to be reduced to an extent that the process is no longer economically attractive. The process of this invention is particularly suitable for thermoplastic polymers having a relative viscosity (measured according to the appropriate ASTM method) below 50.

The spacings between the slots do not have to be equal. Initial impregnation occurs much faster than impregnation at the end of the process. Slots that are reached first by the fibre have to be relatively close, gradually increasing the space between two slots to accommodate slowing of impregnation speed.

The degree of impregnation also depends on the ratio of arcuate surface area: area of slots. The ratio is typically in the range 5 to 20. The length of each slot, in the direction transverse to the bundle, is chosen according to the width of the bundle passing over the arcuate surface; clearly it is unsatisfactory to impregnate only part, for example the middle, of the bundle.

The width of each slot, in the direction along the bundle, is dependent mostly on the viscosity of the polymer. For instance, the slots should not be made too narrow as to cause blocking thereof; however at the same time thin slots allow shear thinning of certain polymers, such as polypropylene. In general more but thinner slots are preferred over less but wider slots. Typical widths of slots are in the range 0.2 to 1.5 mm and preferably 0.2 to 0.5 mm for high viscosity polymers.

The slots are typically fed with polymer by, for instance, an extruder which may be heated if a thermoplastic polymer is being used. The extruder communicates with the plurality of slots through, for example, a bore in the support.

The supply of polymer through the slots in the arcuate surface tends to create a film of polymer under the fibre bundle to be impregnated, which extends over the entire contact area. This film practically eliminates the frictional forces between the fibre bundle and the arcuate surface. Therefore, there is no build-up of tension within the bundle, which normally causes damage to the fibres and which limits the speed of the process.

The degree of impregnation is improved by spreading the fibre bundle over the arcuate surface, thereby reducing the thickness of the fibre bundle on the surface. Reducing the thickness of the fibre bundle reduces the length through which the polymer has to travel, i.e. the impregnation path. Preferred bundle thicknesses are in the range 5 to 25 filaments.

Apparatus suitable for use in the process of the invention can be designed suitably small for use in inline impregnation processes, such as pultrusion of profiles or filament winding.

Examples of suitable reinforcing fibres are glass, carbon and aramide fibres. Examples of suitable thermoplastic polymers, with which to impregnate these fibres, include polyolefin, such as polyethylene and polypropylene, polyesters such as polyethylene terephthalate (PET), and polyketones. Thermosetting polymers may also be used, such as phenolic and epoxy resins.

Referring to FIG. 1, a support 1 has an arcuate surface 2 having side walls 3, i.e. in the form of trench in the support. At least eight slots 4 are provided in the arcuate surface, through which polymer is injected into the fibre bundle. The support is typically connected to an extruder (not shown) which supplies polymer to a central bore 5 in the support, the bore being in connection with the slots 4.

Referring to FIG. 2, a fibre bundle 6 is passed over the arcuate surface 2 in a direction 7. Polymer is injected into the fibre bundle through channels 8, which are in turn supplied with polymer through central bore 5 connected to an extruder. The polymer that exits from channels 8 tends to create a film 9 of polymer over the contact area between the fibre bundle 6 and the arcuate surface 2, and this acts to reduce the friction between them.

The following example illustrates the invention:

EXAMPLE

A 2400 tex glass fibre, with an appropriate sizing, is impregnated with a polypropylene matrix according to the process. The polypropylene has a melt flow index (MFI) of 25 gr/10 min and a relative viscosity of 2.1 (measured according to ASTM D 1601-86 in decalin solution at 0.3% wt concentration). The glass fibre is pulled over an extruder die as shown in FIG. 1. The width of the arcuate surface, transverse to the direction of the fibre, is 14 mm. The fibre bundle is spread over the entire width of the surface, reducing the thickness of the fibre bundle to approximately 7 filaments. The radius of the arcuate surface is 25 mm and the contact angle of the fibre over the surface is 100°. In the surface there are 11 slots, with increasing spacing between them along the fibre direction; the width of each slot is 0.35 mm. The axial tension in the fibre bundle is approximately 80N. The extruder die is mounted on an extruder which heats the polypropylene to 250° C. and supplies it to the tool with a pressure of 2 bar. The impregnated fibre is then led through a heated circular die to produce rods that can be chopped into pellets for injection moulding. The pultrusion speed is 20 m/min.

Test specimens are injection moulded from the pellets and their tensile and flexural properties are measured. The tensile strength measured was 105 MPa, the flexural strength was 195 MPa, and the flexural modulus was 9.3 GPa.

Various modifications of the present invention will become apparent to those skilled in the art from the foregoing description and accompanying drawings. Such modifications are intended to fall within the scope of the appended claims.

I claim:

1. A process of making a fibre-reinforced polymeric material, comprising providing an extruder die having an arcuate support surface (2), and an arc, said arcuate support surface being in the line of the arc, sliding a fibre bundle in a direction (7) over the arcuate support surface (2), and injecting into the fibre bundle a molten or liquid polymer, wherein the polymer is injected through a plurality of slots (4) in the arcuate surface, each slot being oriented substantially transverse to the direction (7) of the fibre bundle movement, wherein spacing between successive slots increases in the direction of bundle movement to accommodate slowing of impregnation speed.

2. The process as claimed in claim 1 wherein at least 12 transverse slots (4) are present in the arcuate support surface (2).

3. The process as claimed in claim 2, wherein the spacing between successive slots increases in the direction of bundle movement.

4. The process as claimed in claim 3, wherein the width of each slot, in a direction along the fiber bundle, is in the range of 0.2 to 1.5 MM.

5. The process as claimed in claim 4, wherein the relative viscosity of the polymer is less than 5.0.

6. The process as claimed in claim 5, wherein the polymer is a thermoplastic polymer selected from polyolefins, polyesters and polyketones.

7. The process as claimed in claim 1 wherein the spacing between successive slots (4) increases in the direction of bundle movement (7).

8. The process as claimed in claim 1, wherein the width of each slot (4), in the direction along the fibre bundle (6), is in the range 0.2 to 1.5 mm.

9. The process as claimed in claim 1, wherein the relative viscosity of the polymer is less than 50.

10. The process as claimed in claim 1, wherein the polymer is a thermoplastic polymer selected from polyolefins, polyesters and polyketones.

11. A method of making a fiber reinforced polymeric material comprising moving a fiber bundle over an arcuate external surface on an extruder dye by injecting said polymer through an axial bore in said extruder die which communicates through radial channels with a plurality of slots on an arcuate external surface, said plurality of slots oriented substantially transverse to the movement of the fiber bundle, wherein spacing between successive slots increases in the direction of bundle movement to accommodate slowing of impregnation speed.

* * * * *